US007677050B2

United States Patent
Sakaguchi et al.

(10) Patent No.: US 7,677,050 B2
(45) Date of Patent: Mar. 16, 2010

(54) CONTROL DEVICE FOR VEHICLE COOLING FAN

(75) Inventors: Shigeyuki Sakaguchi, Yokohama (JP); Makoto Fukubayashi, Col. Polanco (MX); Yoichiro Nakahara, Inagi (JP); Tomofumi Furukawa, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 737 days.

(21) Appl. No.: 11/036,172

(22) Filed: Jan. 18, 2005

(65) Prior Publication Data

US 2005/0178132 A1     Aug. 18, 2005

(30) Foreign Application Priority Data

Jan. 22, 2004   (JP)   ............................. 2004-014225

(51) Int. Cl.
   *F25B 39/04* (2006.01)
(52) U.S. Cl. .......................... 62/183; 62/181; 62/176.6; 62/178; 62/180; 62/184; 62/186
(58) Field of Classification Search ................. 165/202; 62/186, 181, 183, 176.6, 178, 180, 184
   See application file for complete search history.

(56) References Cited

U.S. PATENT DOCUMENTS 4,919,195 A * 4/1990 Tanino ........................ 165/201
6,330,909 B1 * 12/2001 Takahashi et al. ............ 165/202
6,367,270 B2 * 4/2002 Niimi et al. .................... 62/133
6,802,185 B2 * 10/2004 Furukawa et al. .............. 62/89
6,860,112 B1 * 3/2005 Kobayashi et al. ............. 62/89
6,883,340 B2   4/2005 Hirose et al.
2003/0037562 A1 * 2/2003 Honda et al. ............... 62/324.1
2003/0233839 A1 * 12/2003 Hirose et al. .................. 62/186

FOREIGN PATENT DOCUMENTS

| EP | 1375211 A2 * | 1/2004 |
| JP | 7-038625 U | 7/1995 |
| JP | 08-303881 A | 11/1996 |
| JP | 2003-267025 A | 9/2003 |
| JP | 2003-285638 A | 10/2003 |

* cited by examiner

*Primary Examiner*—Frantz F Jules
*Assistant Examiner*—Azim Rahim
(74) *Attorney, Agent, or Firm*—Foley & Lardner LLP

(57) ABSTRACT

A control device for a fan motor (7) which cools a condenser (6) of a vehicle air conditioner includes a temperature sensor (12) which detects a temperature of an air that has passed through an evaporator (10) of the vehicle air conditioner; and a controller (2). The controller (2) functioning to calculate a reference value (Ds) of an airflow generated by a rotation of the fan motor (7); calculate a correction value (DUP, DUPT) of the airflow on the basis of the detected air temperature (Tair); set a target airflow (TDR) on the basis of the reference value (Ds) and correction value (DUP, DUPT) of the airflow; and control the rotation of the fan motor to effect the target airflow (TDR).

15 Claims, 8 Drawing Sheets

CONTROL DEVICE FOR VEHICLE COOLING FAN

TECHNICAL FIELD OF THE INVENTION

This invention relates to a control device for controlling the airflow of a vehicle cooling fan to an appropriate level when an air conditioner is operative.

BACKGROUND OF THE INVENTION

In a vehicle equipped with an air conditioner, a cooling fan which cools a radiator for cooling engine cooling water and a condenser of the air conditioner is usually provided. The cooling fan requires a large electric current to rotate, and hence when the cooling fan is rotated continuously at a high rotation speed, power consumption and noise levels increase.

Jikkai Hei07-038625, published in Japan in 1995, discloses a technique of controlling the rotation of a cooling fan in accordance with the outside air condition and engine operating condition in order to suppress the power consumption of an air conditioner to a minimum. In this conventional technique, rotation of the cooling fan is controlled on the basis of the discharge pressure of a compressor, the engine rotation speed, and the vehicle speed. Here, the discharge pressure of the compressor is determined from three parameters, namely the outside air temperature, the engine rotation speed, and the vehicle speed.

SUMMARY OF THE INVENTION

However, in the aforementioned conventional technique, even when the discharge pressure of the compressor is constant, additional cooling capacity is required of the air conditioner and the cooling fan depending on the humidity, the solar radiation amount, the blower airflow, and so on. To prevent a deficiency in the cooling capacity, a greater cooling capacity than that which is required in reality is effected. As a result, the airflow of the cooling fan is raised excessively, leading to an increase in power consumption and a deterioration in the fuel economy.

It is an object of this invention to detect excess and deficiency in the cooling capacity of an air conditioner and a cooling fan with a high degree of precision, and control the airflow of the cooling fan to an appropriate level.

In order to achieve the above object, this invention provides a control device for a fan motor which cools a condenser of a vehicle air conditioner, comprising a temperature sensor which detects a temperature of an air that has passed through an evaporator of the vehicle air conditioner; and a controller. The controller functions to calculate a reference value of an airflow generated by a rotation of the fan motor; calculate a correction value of the airflow on the basis of the detected air temperature; set a target airflow on the basis of the reference value and correction value of the airflow; and control the rotation of the fan motor to effect the target airflow.

The details as well as other features and advantages of this invention are set forth in the remainder of the specification and are shown in the accompanying drawings.

PREFERRED EMBODIMENTS OF THE INVENTION

A first embodiment will be described with reference to FIG. 1 and FIG. 2.

Figure 1:
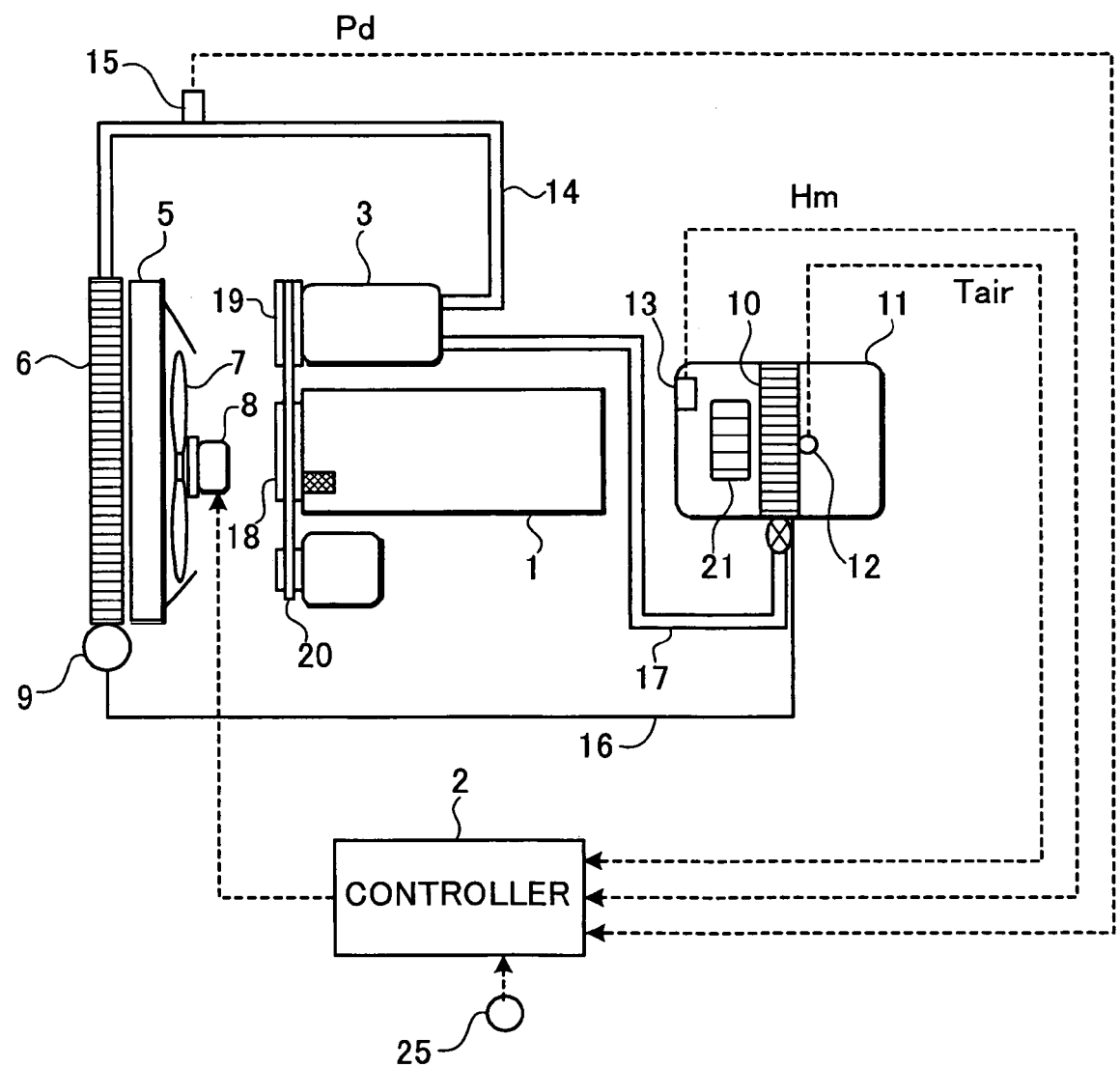
FIG. 1 is a schematic diagram showing an air conditioner (air conditioning system) and a cooling fan control device according to an embodiment.

Referring to FIG. 1, a cooling system of an air conditioner is constituted by a compressor 3, a condenser 6, and an evaporator 10. The compressor 3 aspirates and compresses a refrigerant, and discharges the refrigerant at high pressure. The condenser 6 is mounted further to the front side of the vehicle than a radiator 5, and serves to cool and liquefy the refrigerant discharged from the compressor 3 using outside air. The evaporator 10 absorbs heat from the peripheral air through evaporation of the refrigerant that was liquefied by the condenser 6. An engine 1 drives the compressor 3 using a belt 20 which is wrapped around a crankshaft pulley 18 of the engine 1 and a pulley 19 of the compressor 3.

The gaseous refrigerant that is compressed by the compressor 3 is transmitted to the condenser 6 through a high pressure pipe 14. Having been cooled into a liquid by the condenser 6, the refrigerant is transmitted to the evaporator 10 through a liquid passage 16. Having been evaporated by the evaporator 10 through the absorption of heat from the peripheral air, the refrigerant passes through a low pressure pipe 17, and is again aspirated into the compressor 3 and compressed.

A liquid tank 9 in which the refrigerant is stored temporarily is attached downstream of the condenser 6. A fan motor 7 for generating a flow in the air passing through the condenser 6 and radiator 5 to improve the cooling efficiency of the condenser 6 is provided in the vicinity of the condenser 6. A fan is attached to the fan motor 7, and the fan motor 7 generates an airflow by means of rotation.

A controller (electronic control unit: ECU) 2 is constituted by a microcomputer comprising a central processing unit (CPU), read-only memory (ROM), random access memory (RAM), and an input/output interface (I/O interface). The controller 2 may further comprise a signal generating circuit for generating a duty signal or a PWM control signal.

In this embodiment, the fan motor 7 is a direct current (DC) motor to which a fan is attached. The fan motor 7 is driven by a pulse width modulation (PWM) fan module 8 controlled by the controller 2. The PWM fan module 8 includes a chopper circuit comprising a plurality of switching elements, and is capable of varying the rotation speed of the fan motor 7 in accordance with a duty signal (i.e. a pulse signal having a certain duty ratio) from the controller 2. The duty signal switches the switching elements of the fan module 8 ON and OFF, and the fan module 8 transmits a PWM voltage to the fan motor 7. Hence the fan module 8 is able to vary the rotation speed of the fan motor 7 by driving the fan motor with an effective voltage corresponding to the duty ratio. The effective voltage is typically proportionate to the duty ratio. The rotation speed of the fan motor 7 may be controlled by the controller using another well-known method.

The evaporator 10 is disposed inside an air blowing passage 11 which blows cold air into the vehicle cabin. A blower fan 21 is provided in the vicinity of the evaporator 10. As a result, air is prevented from accumulating around the evaporator 10, and hence the low-temperature air that has been deprived of heat while passing through the evaporator 10 is blown into the cabin through the air blowing passage 11 to cool the cabin interior. In FIG. 1, the side of the evaporator 10 on which the blower fan 21 is provided is the upstream side, and the opposite side is the downstream side.

The high pressure pipe 14 connecting the compressor 3 and condenser 6 is provided with a discharge pressure sensor 15 which detects a discharge pressure Pd of the compressor 3. A humidity sensor 13 which measures a humidity Hm of the air to be blown into the vehicle cabin is provided in the air blowing passage 11 upstream of the evaporator 10. A temperature sensor 12 which detects a temperature Tair of the air directly after passing through the evaporator 10 is provided in the air blowing passage 11 downstream of the evaporator 10. The detected signals of the discharge pressure sensor 15, humidity sensor 13, and temperature sensor 12 are input respectively into the controller 2.

The controller 2 sets a target air temperature tTev downstream of the evaporator (in other words, a target temperature tTev of the air that is discharged from the air conditioner) on the basis of a target cabin temperature tTr set by a driver of the vehicle. The controller 2 also calculates a temperature difference between the actual air temperature Tair detected by the temperature sensor 12 and the target air temperature downstream of the evaporator. By calculating this temperature difference, excess and deficiency in the cooling capacity of the air conditioner (i.e. excess and deficiency in the cooling capacity of the fan motor 7) is detected with a high degree of precision. The driver of the vehicle can set the target cabin temperature tTr by operating a user interface 25 such as a knob, a button, a lever, or a dial.

The controller 2 calculates a target rotation speed of the fan motor 7 required to generate a target fan airflow (or airflow ratio) on the basis of the calculated temperature difference and the discharge pressure Pd detected by the discharge pressure sensor 15, and controls the PWM fan module 8 in accordance with the calculated target rotation speed. Here, the target fan airflow is a target value of the airflow that is generated by rotation of the fan motor.

Referring to the flowchart shown in FIG. 2, a routine executed by the controller 2 to set the target fan airflow will be described. The fan speed required to generate the target fan airflow is controlled by a duty signal from the controller 2. Therefore, setting of the fan airflow corresponds to setting of the duty ratio. The fan airflow increases as the duty ratio increases, because the rotation speed of the fan motor 7 increases as the duty ratio increases.

In a step S1, a determination is made as to whether or not an air conditioner switch is ON or OFF. If the switch is ON, the routine advances to a step S2, and if the switch is OFF, the routine ends.

In a step S2, signals indicating the discharge pressure Pd, the humidity Hm, and the air temperature Tair are read from the discharge pressure sensor 15, the humidity sensor 13, and the temperature sensor 12. The target air temperature tTev downstream of the evaporator 10, which is set in accordance with the target cabin temperature tTr set by the driver, is also read. The target air temperature tTev is lower than the target cabin temperature tTr, and when the target air temperature tTev downstream of the evaporator is achieved, the target cabin temperature tTr is achieved. The controller 2 may set the target air temperature tTev from the target cabin temperature tTr using any known method. For example, a map characterizing the relationship between the target air temperature tTev and the target cabin temperature tTr may be prepared and stored in the memory of the controller 2 and the controller 2 may set the target air temperature tTev by referring to this map.

Figure 4:
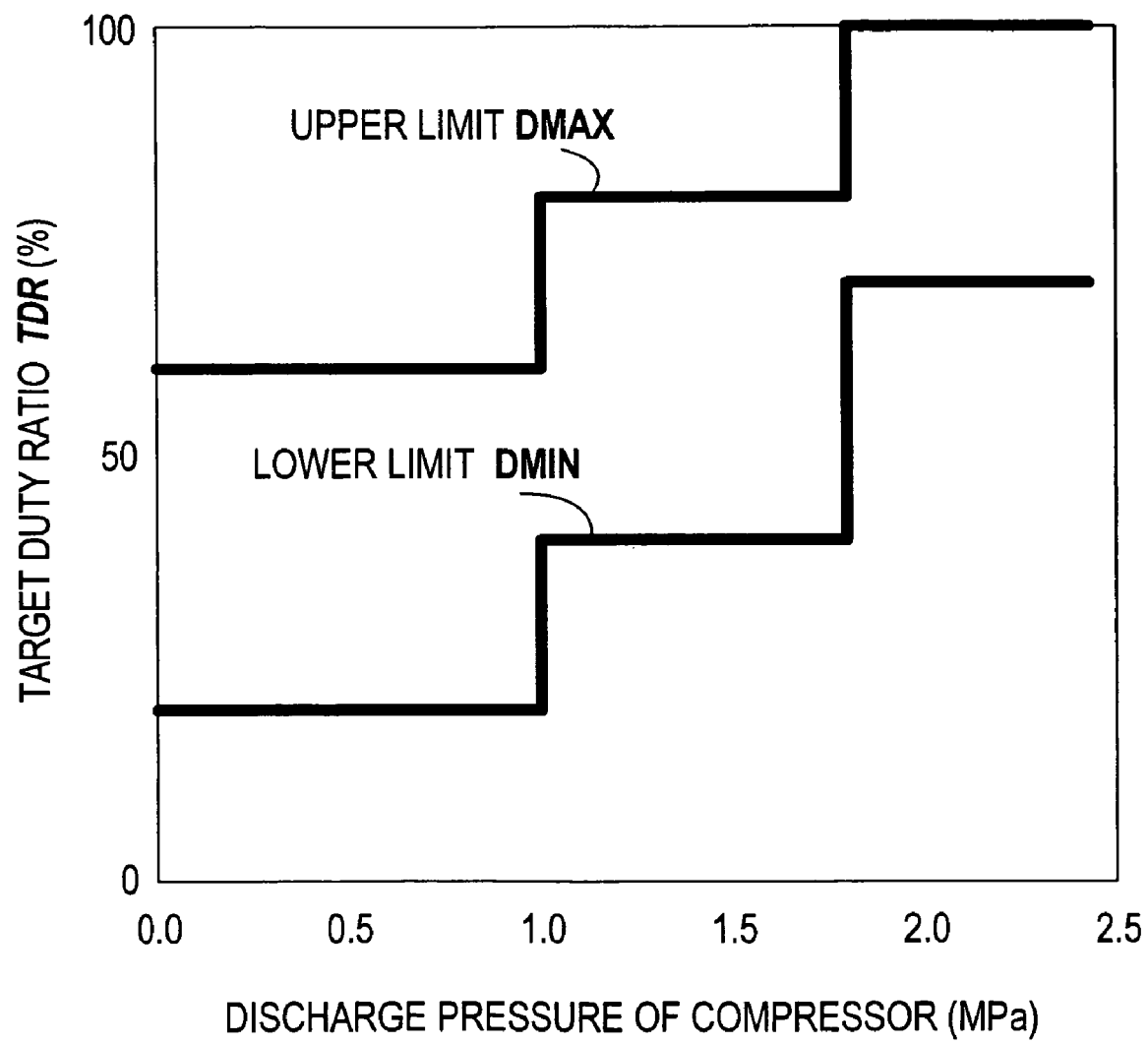
FIG. 4 is a map characterizing a relationship between the discharge pressure of a compressor and a target duty ratio.

In a step S3, an upper limit DMAX and a lower limit DMIN of a target duty ratio TDR are determined on the basis of the discharge pressure Pd read in the step S2 by referring to a map (or a look-up table) shown in FIG. 4. The map is created by determining, through experiment or the like, the appropriate upper limit DMAX and lower limit DMIN of the target duty ratio TDR, in accordance with the discharge pressure Pd. The map is stored in the memory of the controller 2. As shown in FIG. 4, the map characterizes the relationship between the discharge pressure Pd and the upper limit DMAX of the target duty ratio TDR, and the relationship between the discharge pressure Pd and the lower limit DMIN of the target duty ratio TDR. The upper limit DMAX and lower limit DMIN both increase in stages as the discharge pressure Pd rises.

Even when the discharge pressure Pd is constant, the target duty ratio TDR varies depending on the humidity Hm, solar radiation, and the airflow required of the blower fan 21. When the humidity Hm is high, solar radiation is intense, and the airflow required of the blower fan 21 is large, the cooling capacity required of the air conditioner and the fan motor 7 is great, and therefore the target duty ratio TDR should be set at the upper limit DMAX. If, on the other hand, the humidity Hm is low, solar radiation is weak, and the airflow required of the blower fan 21 is small, the required cooling capacity of the air conditioner and the fan motor 7 is small, and therefore the target duty ratio TDR should be set at the lower limit DMIN. When the required cooling capacity of the air conditioner is great, the load on the air conditioner increases, and therefore the duty ratio (i.e. rotation speed of the fan motor 7) must be set high. When the required cooling capacity is small, the duty ratio need not be set high. The maximum duty ratio at which the upper limit of the required cooling capacity of the air conditioner can be generated is the upper limit DMAX. The minimum duty ratio at which the lower limit of the required cooling capacity of the air conditioner can be generated is the lower limit DMIN.

In a step S4, a reference duty ratio Ds (a reference value of the duty ratio) is set to the lower limit DMIN determined in the step S3. Setting the reference duty ratio Ds corresponds to setting a reference fan airflow. The reference fan airflow is a reference value of the airflow generated by rotation of the fan motor.

In a step S5, a temperature difference DLTEVA between the target air temperature tTev and the actual air temperature Tair read in the step S2 is calculated (DLTEVA=Tair−tTev).

Figure 5:
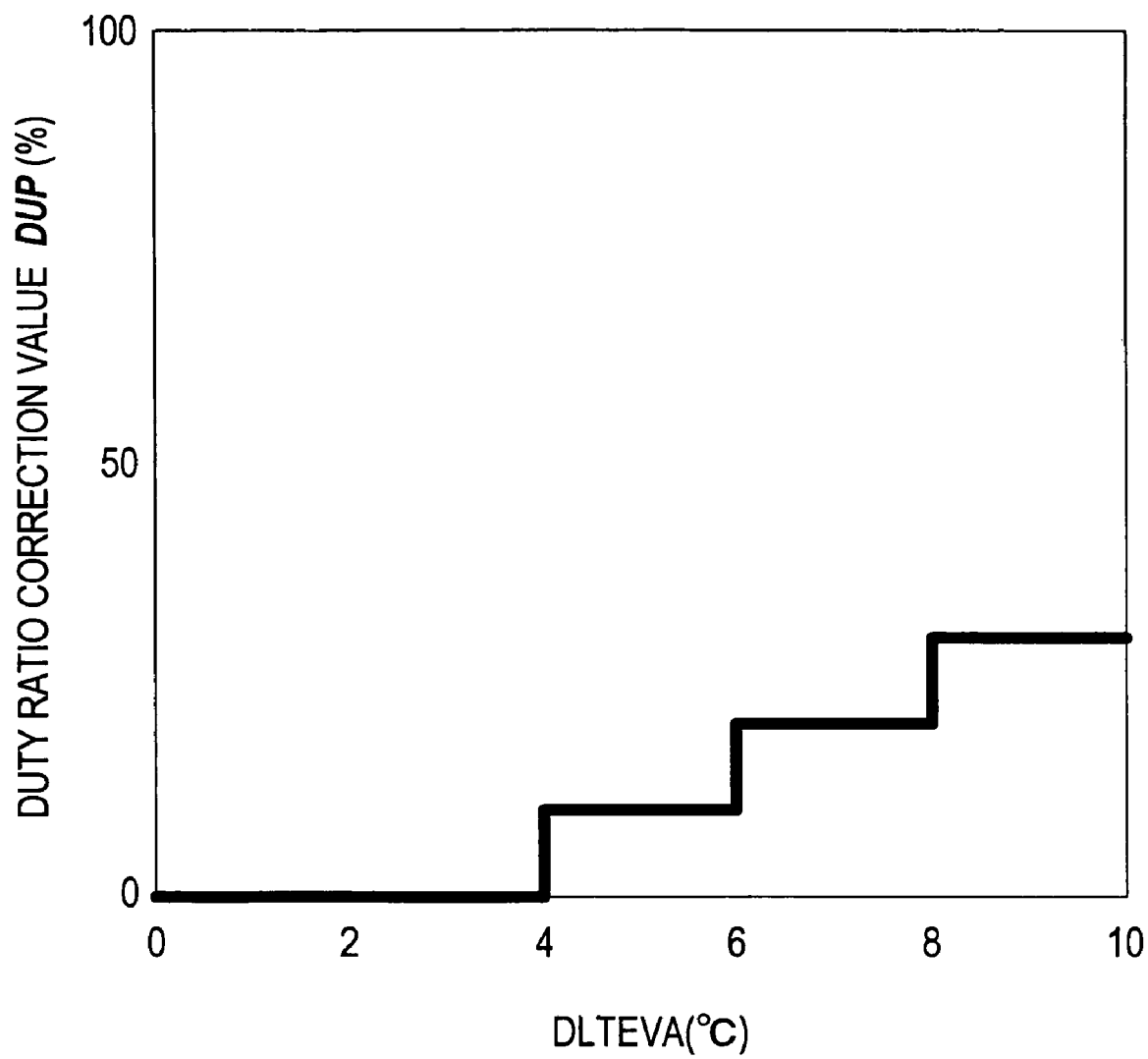
FIG. 5 is a map characterizing a relationship between a correction value of the target duty ratio and a difference between a target air temperature and an actual air temperature of air that is discharged from the air conditioner.

In a step S6, a duty ratio correction value DUP (i.e. a fan airflow correction value) for correcting the duty ratio is determined using the temperature difference DLTEVA determined in the step S5 by referring to a map (or a look-up table) shown in FIG. 5. This map is created by determining, through experiment or the like, the appropriate duty ratio correction value DUP in accordance with the temperature difference DLTEVA between the target air temperature tTev and the actual air temperature Tair downstream of the evaporator. The map is stored in the memory of the controller 2. As shown in FIG. 5, the map characterizes the relationship between the duty ratio correction value DUP and the temperature difference DLTEVA.

The duty ratio correction value DUP increases as the temperature difference DLTEVA increases because it is necessary to increase the rotation speed of the fan motor 7 so as to increase the cooling capacity of the air conditioner as the temperature difference DLTEVA increases. Here, when the target air temperature tTev is higher than the actual air temperature Tair of the air downstream of the evaporator, the duty ratio correction value DUP is zero. When the air conditioner comprises a fuel saving mode in which the target air temperature tTev can be set slightly higher than usual, the target air temperature tTev may vary at the start of the fuel saving mode, and hence accurate fan airflow control can be performed by calculating a correction speed using the difference DLTEVA between the target air temperature tTev and the actual air temperature Tair. It should be noted that the duty ratio correction value DUP may be calculated from the actual air temperature Tair of the air that has passed through the evaporator 10 alone, rather than from the temperature difference DLTEVA.

In a step S7, a determination is made as to whether or not the sum of the reference duty ratio (lower limit DMIN) set in the step S4 and the duty ratio correction value DUP determined in the step S6 (DMIN+DUP) is equal to or less than the upper limit DMAX, or in other words whether or not the corrected duty ratio exceeds the upper limit DMAX.

If the sum of the lower limit DMIN and the duty ratio correction value DUP is equal to or less than the upper limit DMAX, the routine advances to a step S8, where the target duty ratio TDR is set to the sum of the lower limit DMIN and the duty ratio correction value DUP. By setting the target duty ratio TDR, the target fan airflow is set. When the sum of the lower limit DMIN and the duty ratio correction value DUP is greater than the upper limit DMAX, the routine advances to a step S9, where the target duty ratio TDR is set to the upper limit DMAX. By setting the target duty ratio TDR to the upper limit DMAX, the target fan airflow is set to an upper limit. Thus, the target duty ratio TDR is set to the smaller of DMIN+DUP and DMAX.

In a step S10, a duty signal is transmitted to the PWM fan module on the basis of the target duty ratio TDR calculated in the step S8 or S9, and thus the rotation speed of the fan motor 7 is controlled to a target rotation speed for realizing the target fan airflow.

As described above, the upper limit and lower limit of the duty ratio are set in accordance with the required cooling capacity of the air conditioner, and the reference duty ratio is set to the lower limit. Further, the difference between the target air temperature tTev and actual air temperature Tair downstream of the evaporator 10 is calculated, and a correction value is determined on the basis of this difference. The target duty ratio TDR is set to a value obtained by adding the correction value to the reference duty ratio (TDR=DMIN+DUP). However, when the corrected target duty ratio exceeds the upper limit of the duty ratio, the target duty ratio TDR is set to the upper limit (TDR=DMAX).

To summarize this embodiment, a target fan airflow for generating the required cooling capacity of the air conditioner is set on the basis of the temperature Tair of the air that has passed through the evaporator. The fan airflow may be set on the basis of the lower limit of the required cooling capacity, and hence in comparison with a conventional method, the fan airflow (or the fan rotation speed or fan power consumption) when the required cooling capacity is small decreases, leading to an improvement in fuel economy. Further, the required fan airflow increases as the required cooling capacity increases. A deficiency in the fan airflow is reflected in the temperature Tair of the air passing through the evaporator, and the fan airflow rises with an increase of the temperature Tair. Therefore, the target fan airflow in accordance with the required cooling capacity of the air conditioner can be set by detecting the cooling capacity condition with precision.

Further, when the corrected target duty ratio exceeds the upper limit DMAX, the target duty ratio TDR is set to the upper limit. Hence duty ratios which are higher than the required cooling capacity are not effected, enabling suppression of the fan speed such that deterioration of the fuel economy can be prevented. For example, when the air conditioner is activated after a long period of disuse, the air temperature Tair downstream of the evaporator is equal to the cabin temperature immediately after the air conditioner is activated, and therefore the airflow may reach a maximum. In such a case, the upper limit of the duty ratio is set, and hence an excessively large airflow is prohibited, thus preventing noise and deterioration of the fuel economy. Further, excessive rotation of the fan motor 7 is prevented even when correction is performed inappropriately due to a fault in a sensor.

Moreover, the temperature sensor 12 which detects the air temperature Tair downstream of the evaporator is a sensor usually provided to control the air conditioner, and hence there is no need to provide an additional temperature sensor in a conventional cooling system.

Figure 3:
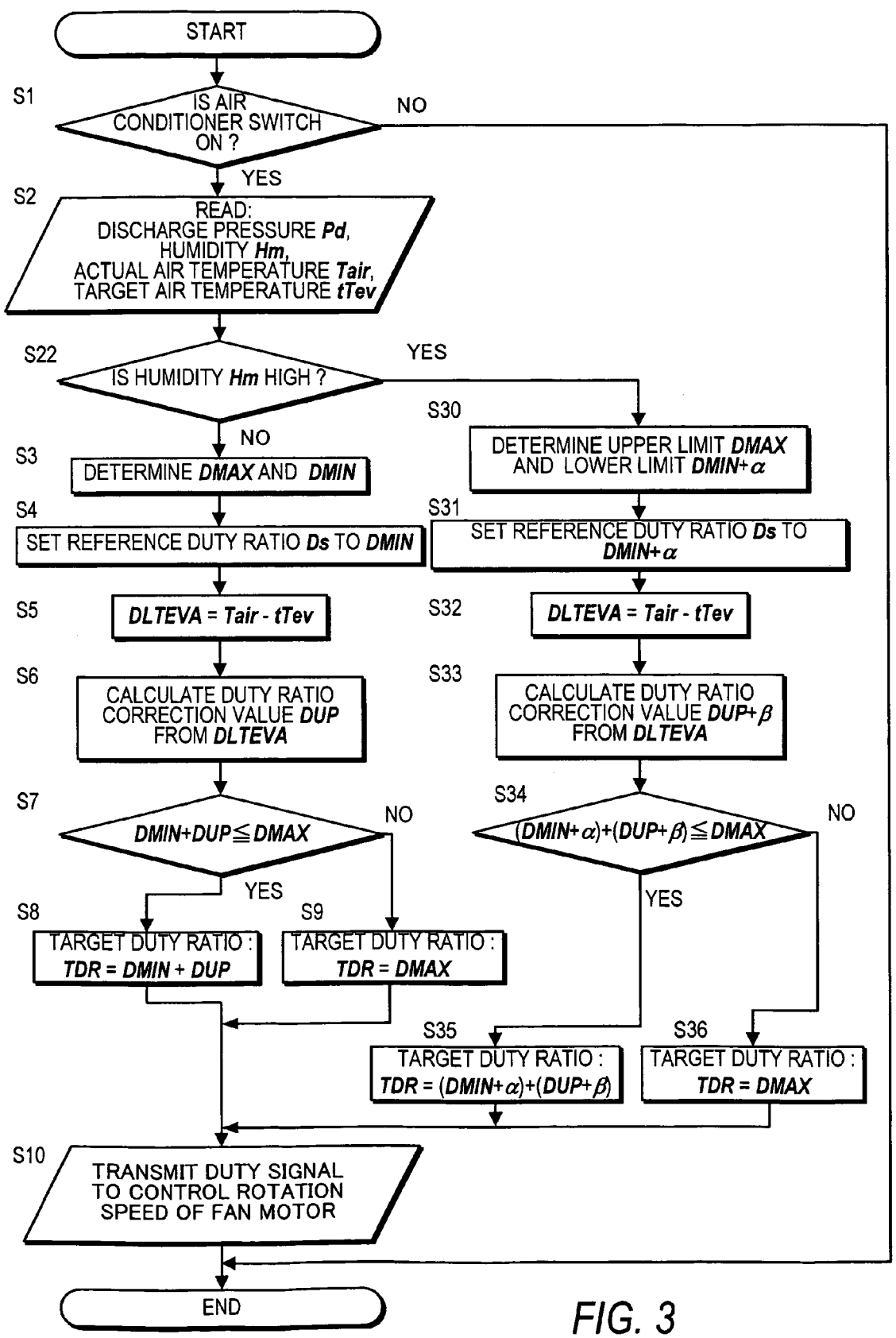
FIG. 3 is a flowchart showing a control routine executed by a controller according to a second embodiment.

Referring to the flowchart in FIG. 3, a second embodiment will be described. It should be noted that in the following, duplicate description of parts exhibiting identical functions to those of the first embodiment has been omitted. In the second embodiment, in addition to the first embodiment, the reference value and correction value of the target duty ratio are modified in accordance with the humidity Hm. The reference duty ratio and the duty ratio correction value increase as the humidity rises.

In a step S22, a determination is made as to whether or not the humidity Hm detected by the humidity sensor 13 is greater than a predetermined value (seventy percent or more, for example). When the humidity Hm is greater than the predetermined value, the routine advances to a step S30. When the humidity Hm is smaller than the predetermined value, the routine advances to a step S3. The processing of the step S3 onward is identical to the processing of the step S3 onward in FIG. 2.

Figure 2:
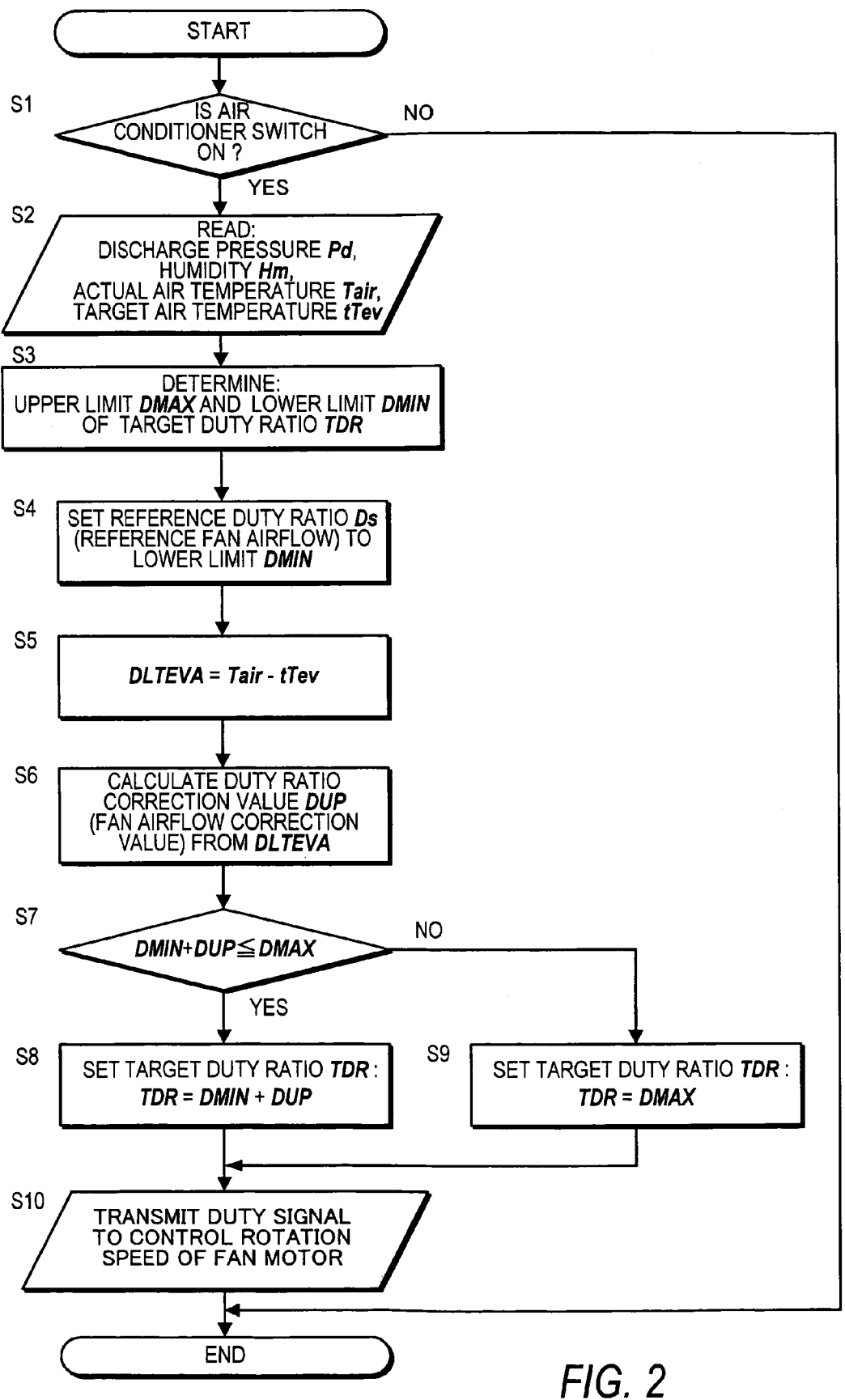
FIG. 2 is a flowchart showing a control routine executed by a controller according to a first embodiment.

The processing from the step S30 to a step S36 is substantially identical to the processing of the step S3 to the step S9 in FIG. 2.

Figure 6:
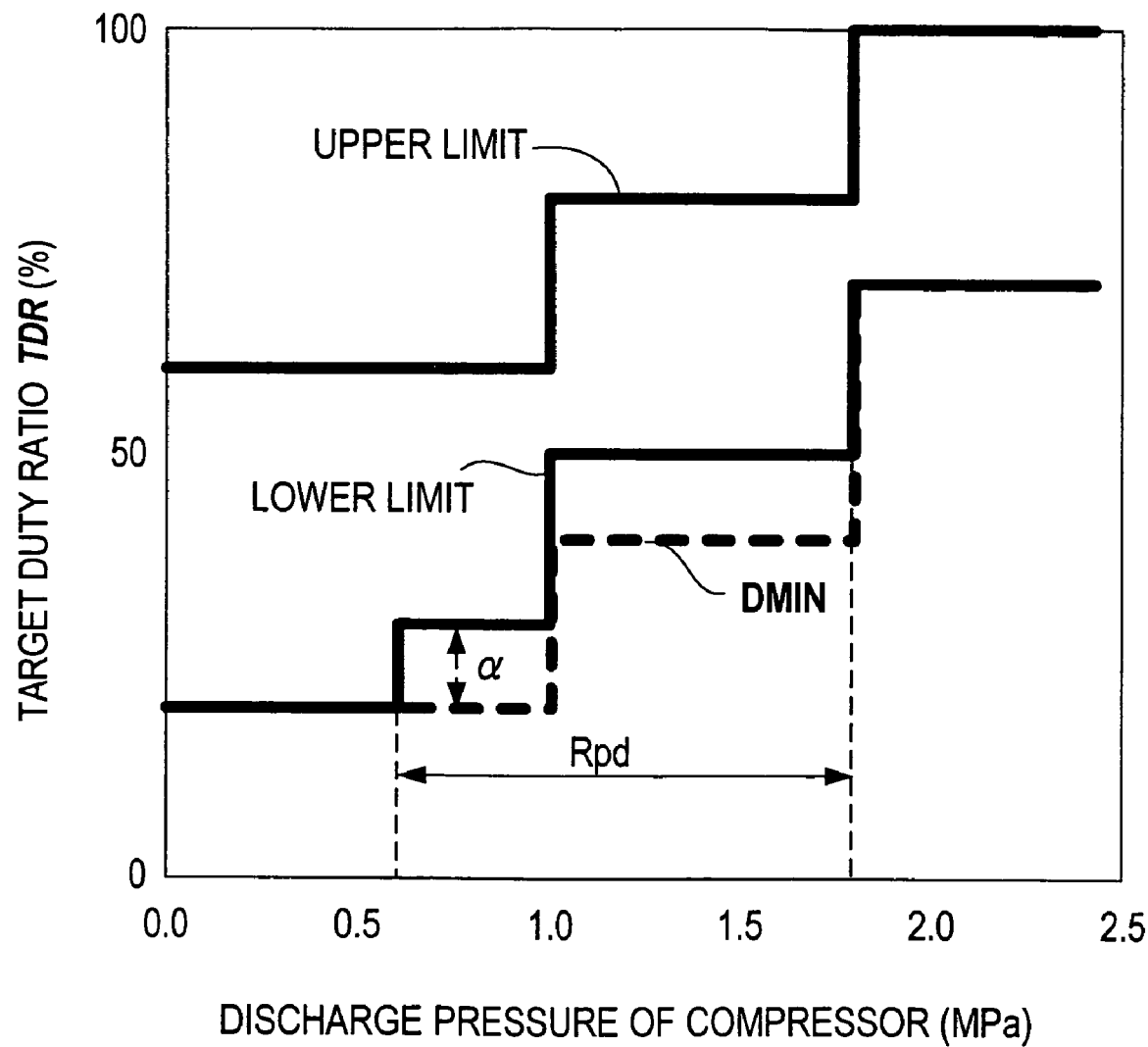
FIG. 6 is a map characterizing the relationship between the discharge pressure of the compressor and the target duty ratio, used under high humidity conditions.

However, as shown in FIG. 6, within a predetermined discharge pressure range Rpd on the map used in the step S30, the duty ratio lower limit is greater than the lower limit DMIN in FIG. 4 by a predetermined amount $\alpha$. That is, the lower limit is DMIN+$\alpha$ within the predetermined discharge pressure range Rpd. In a step S31, the reference duty ratio is set to the lower limit DMIN+$\alpha$ determined in the step S30. By setting the reference duty ratio, the reference fan airflow is set.

Figure 7:
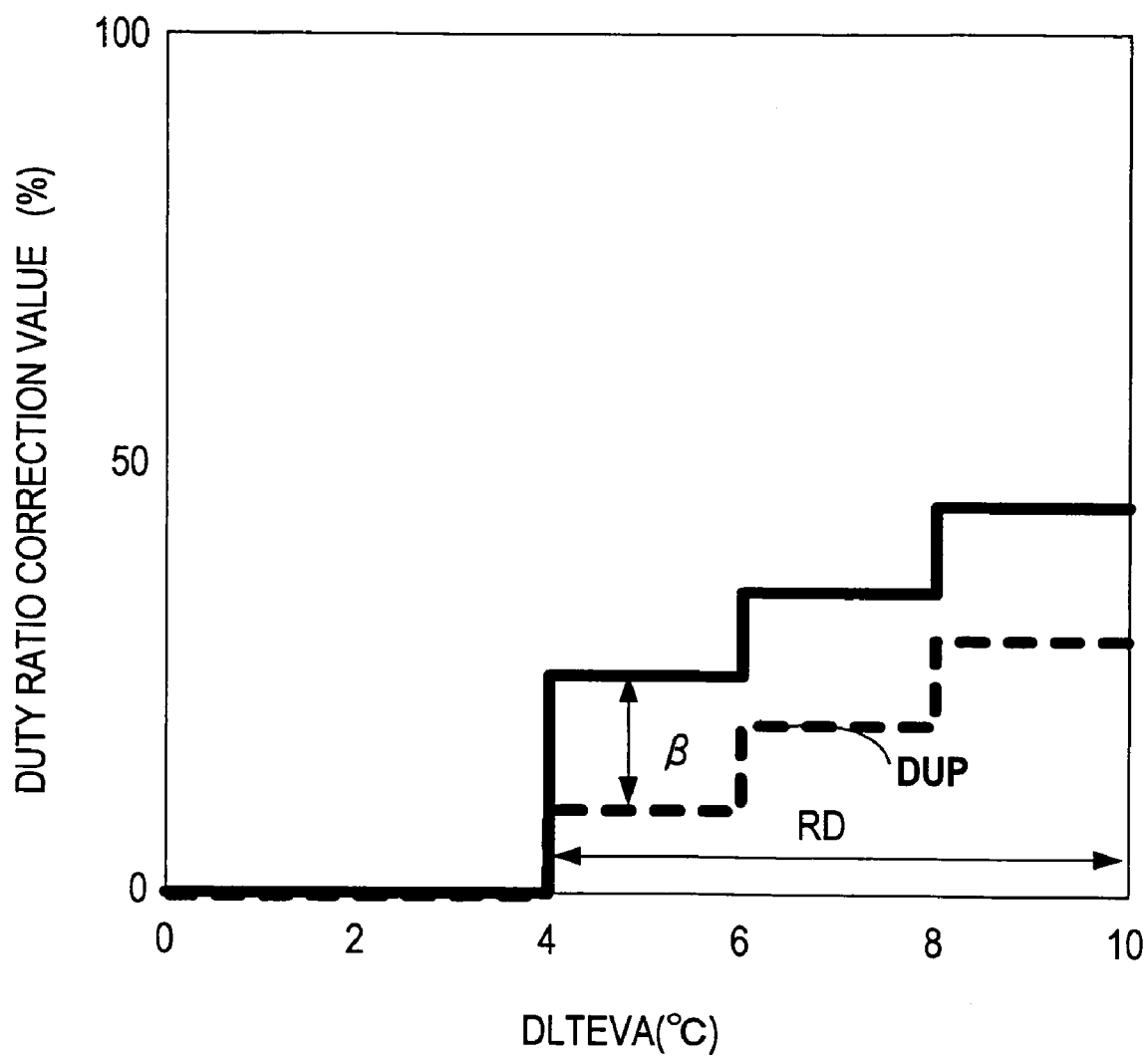
FIG. 7 is a map characterizing the relationship between the correction value of the target duty ratio and the difference between the target air temperature and the actual air temperature, used under high humidity conditions.

As shown in FIG. 7, within a predetermined range RD of the temperature difference DLTEVA on the map used in a step S33, the duty ratio correction value is greater than the correction value DUP of the map in FIG. 5 by a predetermined amount $\beta$. That is, the correction value is DUP+$\beta$ within the predetermined range RD of the temperature difference DLTEVA.

The processing of the steps S33-S36 is similar to that of the steps S7-S9, but with a reference duty ratio of DMIN+$\alpha$ and a duty ratio correction value of DUP+$\beta$. Through the steps S33-S36, the target duty ratio TDR is set to the smaller of (DMIN+α)+(DUP+β) and DMAX.

To summarize the second embodiment, under normal conditions in which the humidity Hm is not particularly high, the upper limit DMAX and lower limit DMIN of the target duty ratio TDR are determined on the basis of FIG. 4, and the duty ratio correction value DUP is determined on the basis of FIG. 5, as described above. Under high humidity conditions in which the humidity Hm is equal to or greater than a predetermined value (seventy percent, for example), the upper limit and lower limit of the target duty ratio TDR are determined on the basis of a map or table in which the lower limit alone is increased beyond its value DMIN under normal conditions, as shown in FIG. 6. Under high humidity conditions, the duty ratio correction value is determined on the basis of a map in which the correction value is increased beyond the correction value DUP under normal conditions, as shown in FIG. 7. In this case, the reference value and correction value of the target duty ratio are switched between two levels, i.e. normal conditions and high humidity conditions, but may be switched between more than two levels.

Under high humidity conditions in which a large load is applied to the compressor, the fan airflow is increased, and the air flow speed is raised proportionately, thereby reducing the time required to attain the target air temperature tTev downstream of the evaporator. As a result, a comfortable air conditioning performance is realized.

Figure 8:
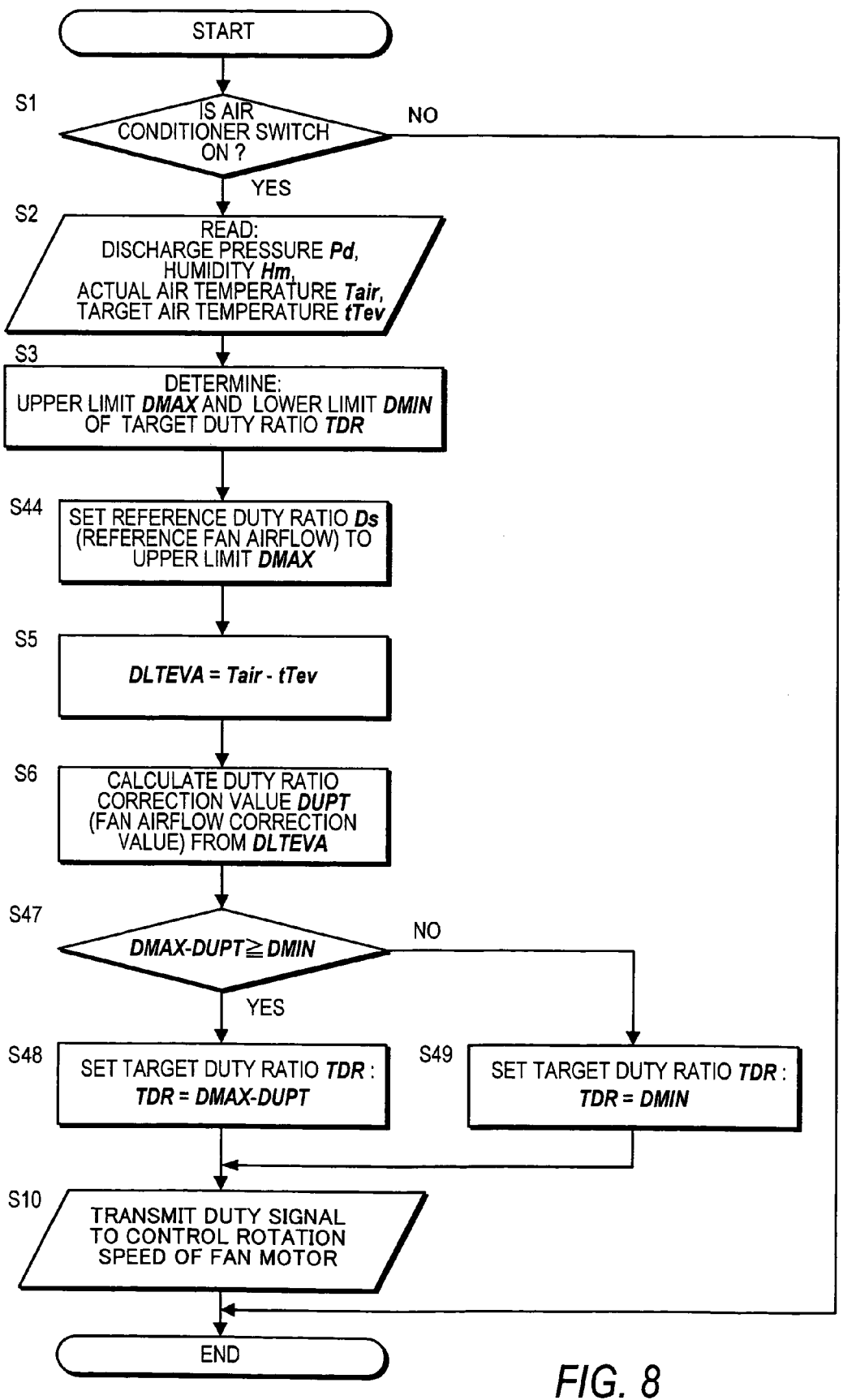
FIG. 8 is a flowchart showing a control routine executed by a controller according to a third embodiment.

Referring to the flowchart in FIG. 8, a third embodiment will be described. In a step S44, the reference duty ratio is set to the upper limit DMAX corresponding to the upper limit of the cooling capacity required of the air conditioner. The correction value DUPT is calculated on the basis of the difference DLTEVA between the target air temperature tTev and actual air temperature Tair of the air that has passed through the evaporator 10. In a step S47, a value (DMAX−DUPT) obtained by subtracting the correction value DUPT from the reference duty ratio (upper limit DMAX) is compared to the lower limit DMIN. If the duty ratio (DMAX−DUPT) corrected using the duty ratio correction value DUPT is larger than the lower limit DMIN, the target duty ratio is set to DMAX-DUPT in a step S48. If the duty ratio (DMAX−DUPT) corrected using the duty ratio correction value DUPT is smaller than the lower limit DMIN, the target duty ratio is set to the lower limit DMIN in a step S49. Thus, the target duty ratio TDR is set to the greater of (DMAX−DUPT) and DMIN. Since it is necessary to increase the rotation speed of the fan motor 7 as the temperature difference DLTEVA increases, the duty ratio correction value DUPT is set to decrease in accordance with an increase in the temperature difference DLTEVA.

In the first through third embodiments, the controller transmits instructions to the cooling fan motor in the form of duty signals in order to regulate the fan airflow. However, when a plurality of fan motors is provided, the airflow may be regulated to the target airflow by performing switching control such that the rotation speeds of the respective fan motors are set to zero or a low rotation speed. In other words, as the target airflow decreases, the controller increases the number of fan motors having a rotation speed of zero or a low rotation speed.

In the first through third embodiments, the fan motor 7 is a DC motor. However, the fan motor 7 may be an alternating current (AC) motor, and the controller 2 may set the target rotation speed of the fan motor 7 directly instead of setting a target duty ratio. When the fan motor 7 is an alternating current (AC) motor, the PWM fan module 8 is constituted by an inverter circuit comprising a plurality of switching elements, and the controller (ECU) 2 transmits a PWM control signal corresponding to the target rotation speed of the fan motor 7 to the switching elements of the inverter circuit. As a result, the inverter circuit outputs to the fan motor 7 a sine wave PWM output having a frequency which corresponds to the target rotation speed of the fan motor 7, and thus the fan module 8 is able to vary the rotation speed of the fan motor 7.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-14225 (filed Jan. 22, 2004) are incorporated herein by reference.

What is claimed is:

1. A control device for a fan motor which cools a condenser of a vehicle air conditioner by generating an airflow passing through the condenser, the condenser liquefying a refrigerant discharged from a compressor, comprising:

a temperature sensor which detects a temperature of an air that has passed through an evaporator of the vehicle air conditioner; and a controller functioning to:
calculate a reference value of an airflow generated by a rotation of the fan motor which cools the condenser;
calculate a temperature difference between air temperature detected by the temperature sensor and a target temperature set in accordance with a cabin temperature, wherein the cabin temperature is set by a driver;
calculate a correction value of the airflow generated by the rotation of the fan motor which cools the condenser on the basis of the calculated temperature difference;
set a first airflow for effecting a lower limit of a required cooling capacity of the air conditioner and a second airflow for effecting an upper limit of the required cooling capacity of the air conditioner;
set a target airflow in a range between and inclusive of the first airflow and the second airflow, on the basis of the reference value and correction value of the airflow; and
control the rotation of the fan motor to effect the target airflow.

2. The control device as defined in claim 1, wherein the reference value of the airflow is the first airflow for effecting a lower limit of a required cooling capacity of the air conditioner, and wherein the target airflow is a total of the reference value of the airflow and the correction value of the airflow.

3. The control device as defined in claim 1, wherein the reference value of the airflow is the second airflow for effecting an upper limit of a required cooling capacity of the air conditioner, and wherein the target airflow is a value obtained by subtracting the correction value of the airflow from the reference value of the airflow.

4. The control device as defined in claim 1, further comprising a discharge pressure sensor which detects a discharge pressure of the compressor of the air conditioner,
wherein the controller functions to set the reference value of the airflow in accordance with the discharge pressure of the compressor of the air conditioner.

5. The control device as defined in claim 4, further comprising a humidity sensor which measures a humidity of air to be blown into a vehicle cabin,
wherein the controller functions to modify the reference value according to a humidity.

6. The control device as defined in claim 5, wherein the controller functions to increase the reference value as the humidity increases.

7. The control device as defined in claim 1, further comprising a humidity sensor which measures a humidity of air to be blown into a vehicle cabin,
wherein the controller functions to modify the correction value according to the humidity.

8. The control device as defined in claim 7, wherein the controller functions to increase the correction value as the humidity increases.

9. The control device as defined in claim 1, wherein the reference value of the airflow is the first airflow for effecting a lower limit of a required cooling capacity of the air conditioner, and
when a total of the reference value of the airflow and the correction value of the airflow is greater than the second airflow for effecting an upper limit of the required cooling capacity of the air conditioner, the controller functions to set the target airflow to the second airflow for effecting the upper limit of the required cooling capacity of the air conditioner.

10. The control device as defined in claim 1, wherein the reference value of the airflow is the second airflow for effecting an upper limit of a required cooling capacity of the air conditioner, and
when a value obtained by subtracting the correction value of the airflow from the reference value of the airflow is smaller than the first airflow for effecting a lower limit of the required cooling capacity of the air conditioner, the controller functions to set the target airflow to the first airflow for effecting the lower limit of the required cooling capacity of the air conditioner.

11. The control device as defined in claim 1, wherein the controller functions to control a rotation speed of the fan motor to a rotation speed at which the target airflow is effected.

12. The control device as defined in claim 11, wherein the controller comprises a signal generating circuit which generates a duty signal, and functions to set the target airflow by setting a target duty ratio of the duty signal, whereby the fan motor rotates at a rotation speed corresponding to the duty ratio.

13. The control device as defined in claim 1, comprising a plurality of fan motors,
wherein the controller functions to effect the target airflow by adjusting a number of fan motors having a rotation speed of zero or a low rotation speed.

14. A control device for a fan motor which cools a condenser of a vehicle air conditioner by generating an airflow passing through the condenser, the condenser liquefying a refrigerant discharged from a compressor, comprising:
means for detecting a temperature of an air that has passed through an evaporator of the vehicle air conditioner;
means for calculating a reference value of an airflow generated by a rotation of the fan motor which cools the condenser;
means for calculating a temperature difference between air temperature detected by the temperature detecting means and a target temperature set in accordance with a cabin temperature set by a driver;
means for calculating a correction value of the airflow generated by the rotation of the fan motor which cools the condenser on the basis of the calculated temperature difference;
means for setting a first airflow for effecting a lower limit of a required cooling capacity of the air conditioner and a second airflow for effecting an upper limit of the required cooling capacity of the air conditioner;
means for setting a target airflow on the basis of the reference value and correction value of the airflow in a range between and inclusive of the first airflow and the second airflow; and
means for controlling the rotation of the fan motor to effect the target airflow.

15. A control method for controlling a fan motor which cools a condenser of a vehicle air conditioner by generating an airflow passing through the condenser, the condenser liquefying a refrigerant discharged from a compressor, comprising the steps of:
detecting a temperature of an air that has passed through an evaporator of the vehicle air conditioner with a temperature sensor;
calculating a reference value of an airflow generated by a rotation of the fan motor which cools the condenser;
calculating a temperature difference between air temperature detected by the temperature sensor and a target temperature set in accordance with a cabin temperature set by a driver;
calculating a correction value of the airflow generated by the rotation of the fan motor which cools the condenser on the basis of the calculated temperature difference;
setting a first airflow for effecting a lower limit of a required cooling capacity of the air conditioner and a second airflow for effecting an upper limit of the required cooling capacity of the air conditioner;
setting a target airflow on the basis of the reference value and correction value of the airflow in a range between and inclusive of the first airflow and the second airflow; and
controlling the rotation of the fan motor to effect the target airflow.

* * * * *